(No Model.) 4 Sheets—Sheet 1.
S. A. COOKE.
MACHINE FOR CUTTING AND MARKING GARMENTS.
No. 478,988. Patented July 19, 1892.
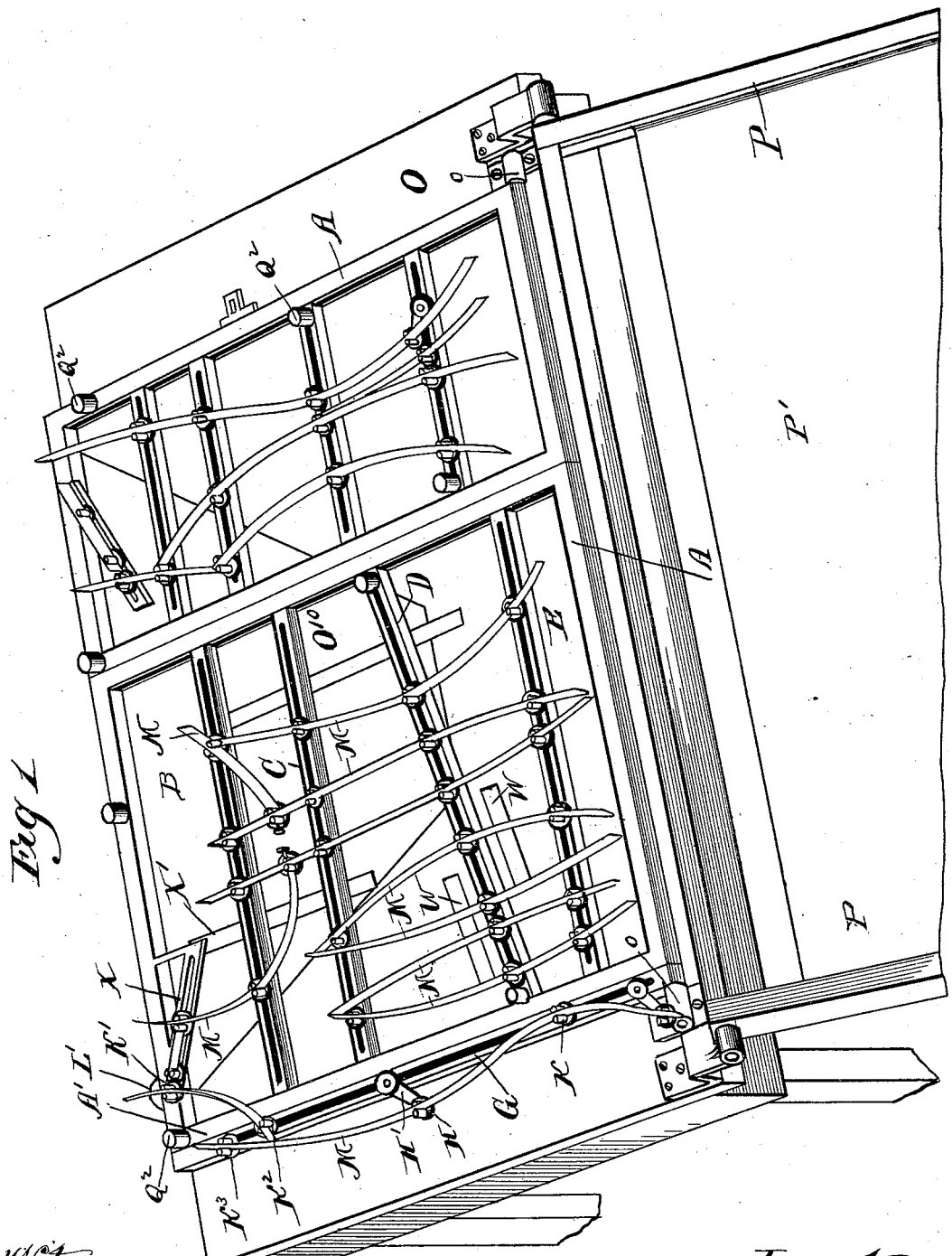

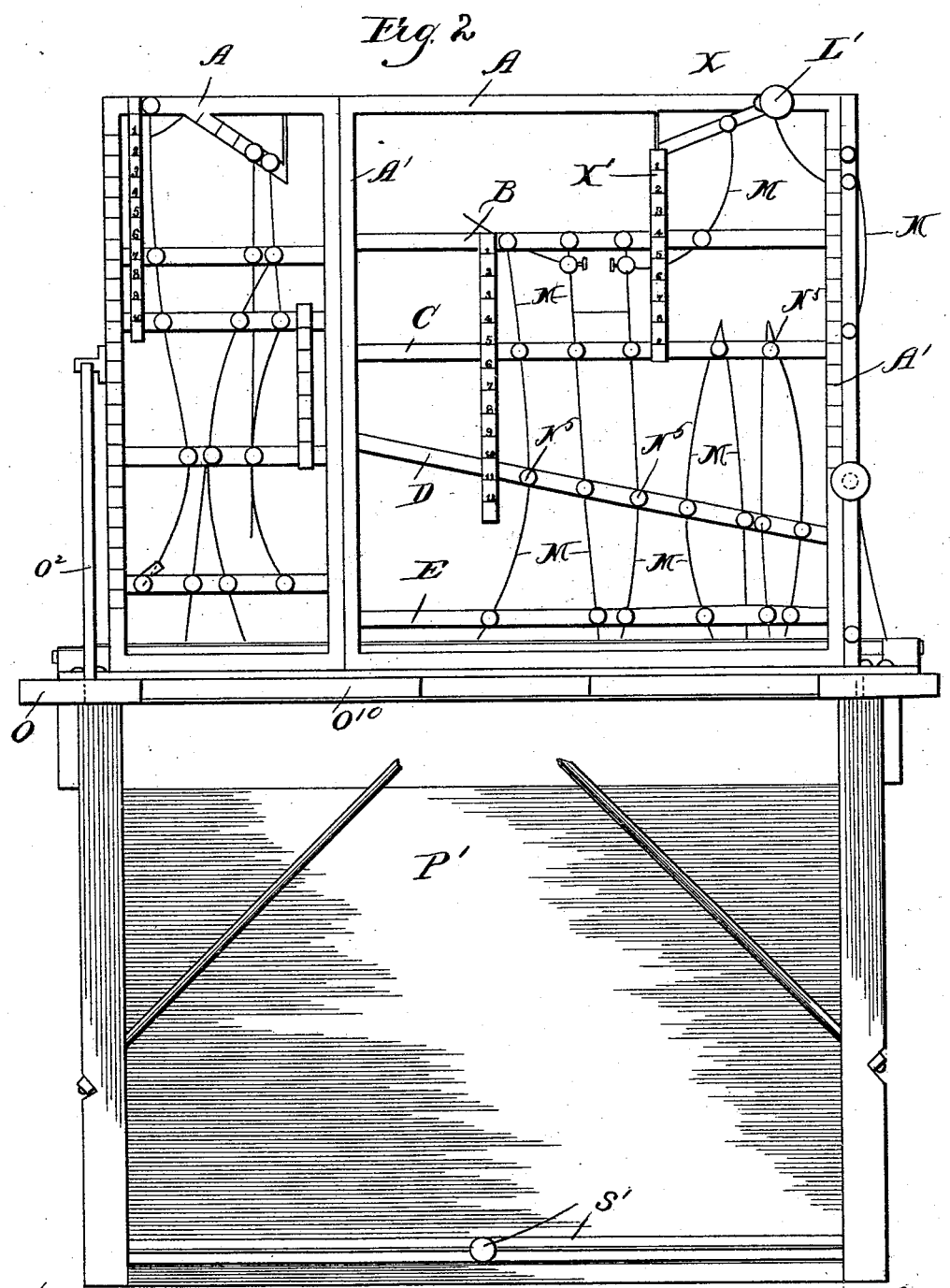

(No Model.) 4 Sheets—Sheet 3.
S. A. COOKE.
MACHINE FOR CUTTING AND MARKING GARMENTS.
No. 478,988. Patented July 19, 1892.
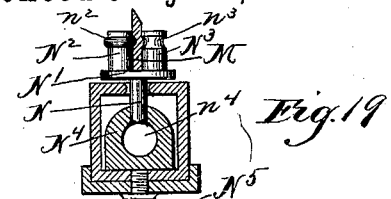
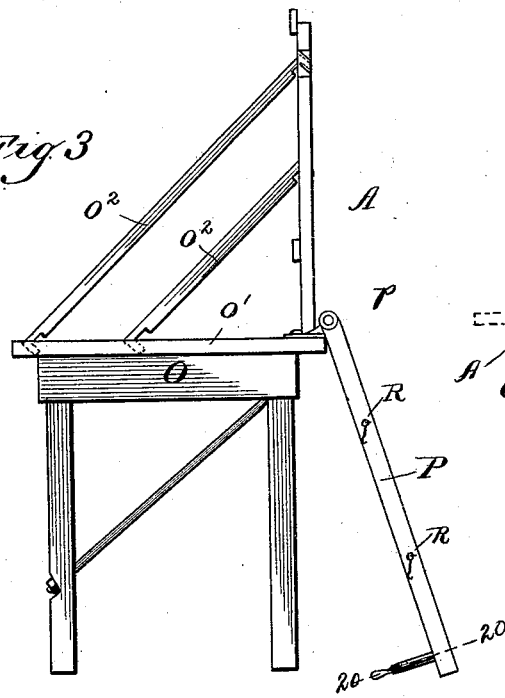
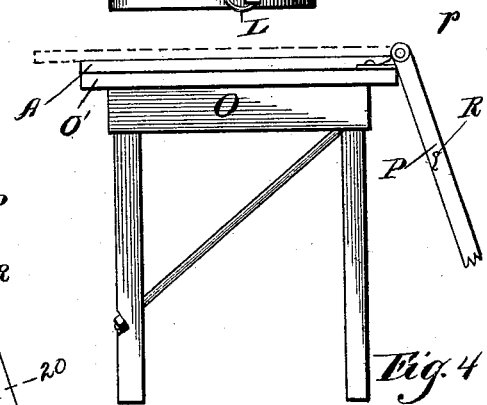
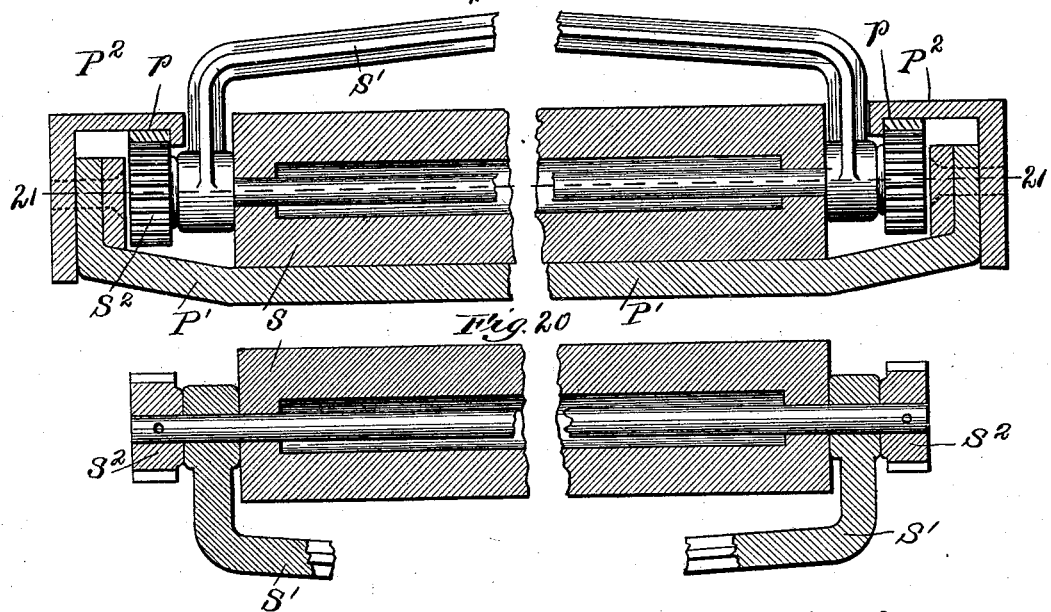
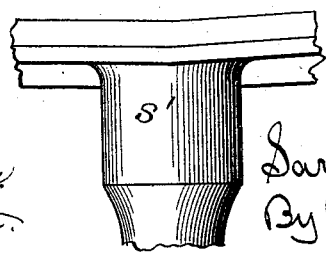
Witnesses.
John L. Tunison
Jean Elliott
Inventor:
Sarah Anne Cooke
By Burton and Burton
her attys.

(No Model.) 4 Sheets—Sheet 4.
S. A. COOKE.
MACHINE FOR CUTTING AND MARKING GARMENTS.
No. 478,988. Patented July 19, 1892.
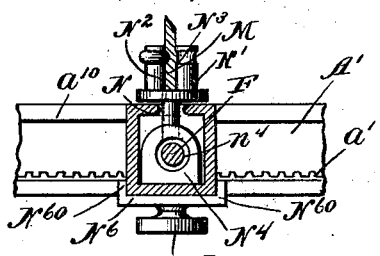
Fig. 5
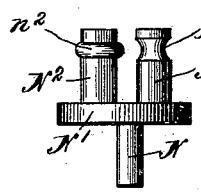
Fig. 6
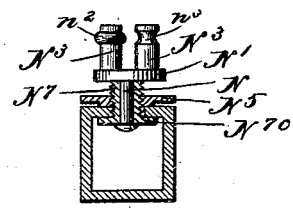
Fig. 7
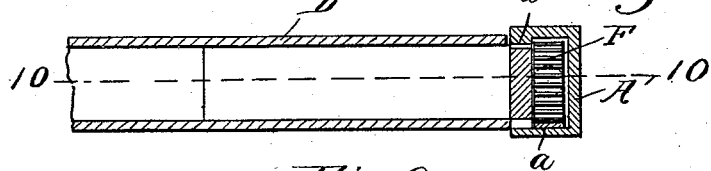
Fig. 9
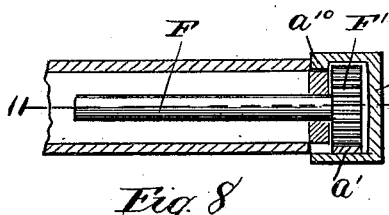
Fig. 8
Fig. 14
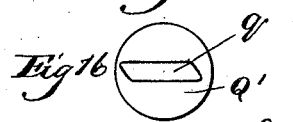
Fig. 16 / Fig. 17
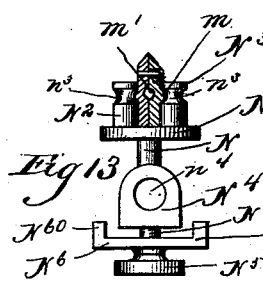
Fig. 13
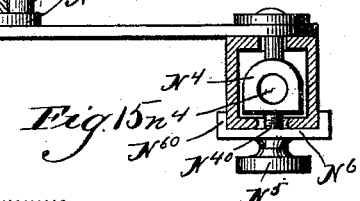
Fig. 15
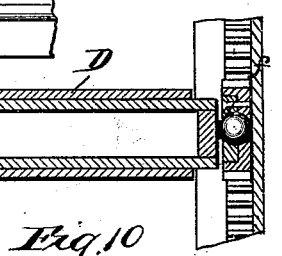
Fig. 18 / Fig. 10
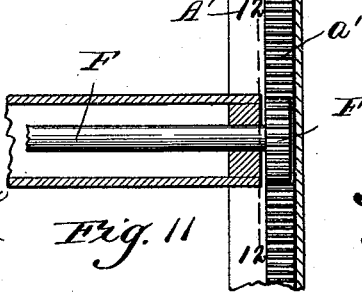
Fig. 12 / Fig. 11
Witnesses.
John L. Timison
Jean Elliott
Inventor:
Sarah Anne Cooke
By Burton & Burton
her attys

UNITED STATES PATENT OFFICE.

SARAH ANNE COOKE, OF CHICAGO, ILLINOIS.

MACHINE FOR CUTTING AND MARKING GARMENTS.

SPECIFICATION forming part of Letters Patent No. 478,988, dated July 19, 1892.

Application filed October 28, 1891. Serial No. 410,146. (No model.) Patented in England November 4, 1887, No. 15,021.

*To all whom it may concern:*

Be it known that I, SARAH ANNE COOKE, a subject of the Queen of England, residing at Chicago, county of Cook, and State of Illinois, have invented certain new and useful Improvements in Stamping and Cutting Machines for Garments and Patterns, which are fully set forth in the following specification, reference being had to the accompanying drawings, forming a part thereof.

Certain parts of said invention have been patented to me in the Kingdom of Great Britain by Letters Patent No. 15,021, dated November 4, 1887.

The purpose of this invention is to provide a machine or appliance by means of which the several parts of garments or patterns for garments may be perforated, marked, or stamped preparatory to cutting, the machine being adjusted to produce the desired outlines of the several parts according to any system of measurements which the operator may choose to follow.

I have illustrated the invention as applied to dress-cutting according to a system of my own; but it is applicable to the cutting of all garments and by any system of measurement.

In the drawings, Figure 1 is a perspective of my invention in position for receiving the goods to be marked or cut. Fig. 2 is a front elevation of the same with the frame which has the cutting and marking blades upright, which is the position occupied when the operator is adjusting the same. Fig. 3 is a side elevation corresponding to Fig. 2, on a reduced scale. Fig. 4 is a side elevation corresponding to Fig. 1, also on a reduced scale. Fig. 5 is a sectional elevation of a swiveled device for supporting and adjusting the cutting and marking blades, the bar in which it is adjustably secured being shown in transverse section and a detail portion of the side bar of the frame being shown in side elevation. Fig. 6 is a detail side elevation, on an enlarged scale, of the immediate support for the cutting-blades detached from the remainder of the swiveled device shown in Fig. 5. Fig. 7 is a sectional detail showing a modified form of the said swiveled device adapted for use when the blades are to be adjusted from the upper or operating side only, the frame-bar and part of the clamp which holds said device being shown in section transverse to the length of the bar and axially with respect to the swivel-stem. Fig. 8 is a longitudinal section through one of the movable bars in which the swiveled blade-supports are adjusted, the section extending across the rigid side bar of the frame and showing in elevation the shaft and pinion thereon which is journaled in said movable bar. Fig. 9 is a similar section of a portion at one end of one of said movable bars which is adapted to be adjusted obliquely, showing a telescoping extension, which has the bearing for the pinion, with which it makes a ball-and-socket joint. Fig. 10 is a section at the line 10 10 on Fig. 9. Fig. 11 is a section at the line 11 11 on Fig. 8, showing the shaft and pinion in plan. Fig. 12 is a section at the line 12 12 on Fig. 11. Fig. 13 is an elevation of the swiveled blade-carrying device of the form which is shown in Fig. 5 modified for the purpose of carrying two blades side by side. Fig. 14 is a detail side elevation of lapped portions of two blades, such as are represented in section in Fig. 13. Fig. 15 is a detail elevation of a device for adjusting the position of a swiveled blade-guide when it is necessary to adjustably hold such blade at a point removed from any bar, the bar to which such device is secured being shown in transverse section, as in Fig. 5. Fig. 16 is a bottom plan, and Fig. 17 a side elevation of a stool which is adjustable on and removable from the several bars and is designed to afford means for securing cloth or paper by pins or tacks at all necessary points. Fig. 18 is a side elevation of one of the blades shown as especially adapted for perforating or marking. Fig. 19 is a sectional elevation of the swiveled blade-holding device, such as is seen in Fig. 5, with a measuring-tape appended to its stem. Fig. 20 is a sectional elevation of the device for forcing the material to be cut or marked onto the cutting or marking blades, section being made at the line 20 20 on Fig. 3 through the axis of the roller which pertains to said device and through the frame in which it operates, the handle and middle portion of the entire device being broken away. Fig. 21 is a section at the line 21 21 on Fig. 20, the handle being partly broken away, the middle portion of the roller and its shaft and portions intermediate the ends and the yoke being broken away to condense the figure.

Fundamentally my invention consists in flexible blades with edges suitable for marking or for perforating or for cutting, as desired, and supports for such blades by which they are held edgewise with their operating edges at the same plane, and a frame or base in which such supports are adjustable to vary the contour of the blades and adapted to be secured. The particular form of the supports and the construction of the frame by means of which they are made adjustably securable therein are preferred but not indispensable features; but from the description of the specific preferred form it will be obvious how the principle of my invention may be applied in other forms.

A is a rigid rectangular frame, of which in the principal figures two are shown, which are rigidly united and are designed the one to contain the device for cutting or marking the front and side portions and the other to contain the devices for cutting or marking the back portions of a dress. It will be understood that these two are not necessarily united in one machine, and it will be necessary to describe only one of them and the parts which it contains, and I have applied the letters of reference to the one which I will describe—to wit, the larger of the two frames shown in the drawings, which contains the front and side cutting or marking appliances. This rigid frame A is preferably made of channel-bar, with the open sides inward, and the two side bars A′ A′ each contain on the lower flange a rack $a'$.

B, C, and E are transverse bars extending between the sides A′ A′ of the rigid frame and having extending longitudinally through them, respectively, shafts F, having journal-bearings at the ends of the transverse bars, respectively, and having pinions F′ F′, rigid with them, at their opposite ends outside their bearings, said pinions being adapted to mesh with the racks $a'$ in the side bars A′ of the rigid frame. The pinions being equal and the racks being similar, it will be understood that if the transverse bar is first placed in the frame in position at right angles to the side bars A′, with its pinions meshed with their corresponding racks, respectively, any movement which such transverse bar may receive at either end tending to cause the pinion at that end to roll in the rack will be immediately communicated to the other end of the bar by the shaft F, causing the pinion at the opposite end to roll in engagement with its rack, and thereby carry its bearing and that end of the bar an equal distance. Thus all positions of the transverse bars which have these shafts F extending throughout their length and carrying rigid pinions must necessarily be parallel, and in adjusting any such bar pressure may be applied at either end of it to push it the desired distance, and it is not necessary in order to keep the bar at right angles to the side bars of the frame to apply the pressure at both ends or at more than one point.

For certain purposes in the system to which I have applied this machine the bar D, which corresponds to the waist measure, (the bar B corresponding to the chest measure, the bar C to bust measure, and the bar E to hip measure,) should be adjusted differently at opposite ends, and its various positions are not, therefore, necessarily parallel with each other, and I therefore provide this bar with independent pinions at its opposite ends—that is, pinions not rigid on the same shaft—and I mount said pinions by means of stud-axles $f$ in bearing-pieces, which telescope a short distance in the ends of the bar D, so that the pinions will remain in engagement with the racks at the opposite sides, respectively, of the frame when the bar D is shifted from direct transverse to oblique position to accommodate varying relations of front and side length measurements. The stud-axles $f$ make ball-and-socket joints with their bearings, so that the pinions may remain in mesh with the racks, notwithstanding the varying obliquity of the bar D, and to retain said pinions in the racks the upper flange of the channel-bar which constitutes the side A′ has a downwardly-projecting lip, preventing the withdrawal of the pinion which is introduced in the original assembling of the machine at some point beyond the normal range of the pinion on the side bar, where the lip $a^{10}$ is cut away to admit the pinion.

M M M, &c., are flexible metal blades, which are provided with the cutting, perforating, or marking edges by which the desired outlines of the pattern or garment are indicated or produced. These blades may be modified according to the use, whether cutting, perforating, or marking, although one form of edge may to a degree serve all three purposes.

A plain cutting-edge, such as is represented in the principal figures, if it be not sharp enough to cut, will mark a pattern, the usual device of interposing a carbon-sheet facing the goods to be marked being employed, and the serrated blade shown in Fig. 18 answers equally well for perforating if the serrations are acute, or for marking in dotted line if they are somewhat blunt or if less pressure is employed, or with sufficient pressure may serve for cutting certain classes of goods. The character of the edge of the blade in no way affects the mode of operation of the device, and one set of blades may be removed and another set with a different edge substituted, according to the work to be done. These metal strips are designed to be held at certain controlling-points or the lines of measurement of the figure, and by their flexibility and elasticity to shape themselves in flowing curves or direct lines, as the circumstances may require, between such points, and thus outline the several parts of the garment. If they are to be used for marking or for perforating patterns or stencils from which patterns are to be made, the controlling-points for these edges will be located so that the blades will correspond in position to the seam-lines; but if the strips are provided with cutting-edges their controlling-points will be located seam-widths outward from the seam-lines, respectively. The transverse bars B, C, D, and E being set in the rigid frame at positions corresponding to the chest-line, bust-line, waist-line, and hip-line, as determined by the measurements of the form to be fitted, the blades M M M must be set and fixed at proper points on these several bars in order that they may produce the proper outlines for the garment or pattern, and for this purpose I provide the blade-supports, which I will now describe.

N is a short spindle of a disk N', from the upper side of which project two posts $N^2$ and $N^3$. The spindle N passes through a longitudinal slot in the transverse bars B, C, D, or E, while the disk N' rests above said bar. The space between the posts $N^2$ and $N^3$ is adapted to receive the blades M, and in some instances, when these blades slide by each other in a manner similar to telescoping, the space between the posts $N^2$ and $N^3$ is sufficient to admit a double thickness of the blades M. Said blades are provided with a bead and furrow $m\ m'$, and the posts $N^2\ N^3$ are preferably provided, respectively, with a bead and groove $n^2\ n^3$, corresponding to said bead and furrow on the blade, and the engagement of said bead and furrow with the bead and groove on the posts retains the blade in position, while permitting it to slide freely longitudinally. Any two consecutive blade-supports pertaining to a particular blade being adjusted to their relative positions on their corresponding transverse bars, the blade supported by them would naturally tend to fall in a direct line between them, and the swiveled post would adjust itself on its swivel-axis to that line; but if a third guide for the strip, when properly adjusted on its bar, is out of that line the blade will naturally assume a curved position through the three points and each swivel will adjust itself on its axis with the two posts $N^2$ and $N^3$ in the radius of curvature of said curve at the point at which such support stands.

For the purpose of securing the blade-supports in adjusted position on their respective transverse bars and at the same time permitting the immediate seat of the blade to swivel freely, the spindles N are swiveled in the yoke $N^4$, which is located within the transverse bar and has a central aperture $n^4$ for the shaft F and at the back or under side bears upon the inner surface of that side of the transverse bar and has the threaded stem $N^{40}$ extending out through the slot in that side of the bar. A thumb clamp-nut $N^5$ is applied to this stem and might be made to bind directly against the outer surface of the bar; but since the bar is slotted at both sides, and therefore liable to spread, I prefer to interpose on the stem $N^{40}$, outside the bar and between said bar and the clamp-nut $N^5$, the clasp $N^6$, whose flanges $N^{60}\ N^{60}$ embrace the bar and prevent it from spreading. This clasp, considered with respect to the clamp-nut and the threaded stem $N^{40}$, is of the nature of a washer.

In every system of measurement the various dimensions are laid out from certain selected points, and my machine is adapted to have scales mounted or marked upon it in position to facilitate the adjusting of the bars in the first instance and afterward of the blade-supports at the proper distances from each other and from whatever fixed points of measurement are necessary in the particular system employed. I have shown such scales located at the positions in which they are most convenient for use in the system in connection with which I have used this machine, and it will be obvious to any one familiar with the art in what manner the position of these scales should be changed to adapt them to any other system. In my said system the end of the shoulder-bar X is one of these fixed points of measurement, and a scale is laid off on said shoulder-bar for the purpose of adjusting the support which carries the upper end of the armhole-blade, and from the end of said shoulder-bar a scale X' extends downward, lying back of the bars B and C, to facilitate the adjustment of the bar B, and in some systems it might be used to adjust, also, the bar C; but in my system I use as a fixed point from which to adjust the blade-support K the blade-support K', which is fixed on the upper side bar of the frame A, and when that blade-support K is adjusted and fixed according to the proper measurement taken on the figure I adjust from it as a fixed point certain other points—as, for example, the blade-support $K^2$. In order to facilitate making such adjustments as these, which either are not made along any one of the straight bars or are not made by measurement from a point which is permanently fixed on the frame, I mount on that blade-support from which the measurement is to be made a spring-tape L, the center of its case L' being fixed at the point at which the measurement starts, the scale on such tape being made to read correctly from the end, but being provided with a special mark at a distance from the end equal to the radius of the tape-case, so that the tape being drawn out until the measurement desired is visible at the mouth of the case the blade-support to be adjusted to that measurement will be correctly located by being set at its special mark, or the scale being made to read as much more than the distance from its end as the radius of the case L'. I prefer the first method, because the tape is then available for ordinary measurements without correction.

A convenient mode of mounting the spring-tape on the blade-support is shown in the drawings, Fig. 19, an interiorly-threaded hub being formed at the center of the tape-case L', and the case being thereby screwed onto the threaded end of the stem $N^{40}$ of the yoke, said stem being made long enough for that purpose. When the tape-case is to be connected at a blade-support which is a fixed post, as K', a fixed threaded stud set on the frame at the back side answers as a means for securing it.

The side bars A' A' may have scales marked upon them by which such of the bars B, C, D, and E as require adjustment from the fixed point on the frame may be adjusted, and in lieu of the scale X', which extends from the point of the shoulder-bar, a scale may be laid off on one of the side bars A' A', commencing at a point in transverse line with the point of the shoulder-bar. In my system none of the other bars except B are designed to be adjusted according to a fixed scale on the side bars; but in other systems such scales may be useful on a machine.

The blades M, which denote the dart-lines, are adjusted on the guide-posts at their supports on the bar D by reference to scales W W, which are laid off in units proportional to certain other measurements of the figure according to a certain system, which need not be herein explained, and may be used differently by different operators, said scales W being therefore made according to the system employed. The scales measure the amount which is cut out between the dart-lines, and they are graduated, therefore, in each instance from one dart-line to the opposite dart-line and will be set on the bar D with the unit of the scale at the dart-line from which the measurement commences after the position of that dart-line has been determined and its adjustable support set on the bar D. The advantage of securing these scales W permanently to the machine is that, since they are special scales which are worked out to correspond to the system of measurement which the operator employs and are not made upon any accepted standard of lineal measurement, their misplacement or loss would embarass the operator and necessitate a complicated calculation based upon the various measurements in order to set the dart-lines without such scale.

The blade for the front edge of the front of the garment is preferably carried in supports which run in the slotted bar G, secured on the outer side of the side bar A' of the rigid frame rather than upon any of the transverse bars. Two supports on said bar G primarily hold this blade, one $K^3$ being located at the upper end and the other K being designed to be adjusted at the waist-line. Between these two supports there is mounted on the bar G a blade-support H, of the form hereinabove described, except that instead of the swiveled seat for the blade it has a lever-arm H', on the free end of which there is mounted a support for the blade, having the swiveled seat for the blade, as already described. This support H is designed to be adjusted longitudinally on the bar G and circularly about its swivel-axis at that bar to bring the swiveled seat for the blade at the free end of the arm H' in proper position, the said arm H' being swung outward from the bar G as far as necessary to give the proper swell to the garment to correspond to the measurement of the figure at the bust-line. A similar device may be employed at the lower end of the front-line blade to give the necessary swell at or below the hip portion, as seen in Fig. 1.

The same device may be employed in other situations and is employed in other parts of the garment; but these two instances will be sufficient to indicate its mode of use.

In order to avoid having the blades M protrude beyond the margin of the part which they are to cut or mark, as will be especially undesirable when they are provided with cutting-edges, because, as will be apparent from the subsequent description, they would then cut into the cloth beyond the limits of the garment and thereby waste the material, I prefer to make them each in two or more pieces which lap by each other, both passing through any swiveled seat which is located at such lapping portion, the amount of the lap being sufficient to allow for all variations of length of each blade—that is, instead of sliding through the seats on the supports nearest their ends they may be fixed in those seats, which are nevertheless swiveled, and slide only through the intermediate seats and both lapping parts slide through the same intermediate seat. In the principal figures I have not thus represented them, the scale being too small to make this detail clear in those figures; but this modification is shown in Fig. 9. Fig. 13 also represents the two lapping sections of the blade engaged in the swiveled seat.

The rigid frame, with the adjustable parts and cutting-edges already described, may be used without other appliances, the paper or cloth to be cut or marked being laid upon the perforating or cutting edges of the blades after they are adjusted and secured in position, and the cutting or marking be effected by pressing the cloth or paper down onto such edges by any convenient means, and in case of marking or perforating it is entirely practicable to complete the process by following each marking-edge with the finger or soft roller on the upper side of the cloth or paper to print or perforate it; but for greater convenience I prefer to mount this rigid frame on the table or stand O, this stand comprising, necessarily, supports and a top O', which is cut away at one side, forming a recess $O^{10}$, and the frame A is hinged by its lower edge at the opposite side of the table in the bearings o o, so that said frame may be set upright, as seen in Fig. 3, and supported in that position by any suitable check strap or brace O². The recess O¹⁰ is deep enough to permit the operator to stand in it close enough to the upstanding frame to adjust its blades and secure them. It will be observed that in this position the operator is at the back side of the frame and that the clamp-nuts N⁵ are located at the back side, so that while making the proper adjustments all danger of cutting or scratching the hands upon the cutting or perforating edges is avoided. The scales for adjusting the various blades are upon this side of the frame; but they may be also upon the other side, as it will often be convenient to make a slight correction or readjustment after the frame is folded down to horizontal position, and for this purpose to refer to the scales. When the adjustment has been made with the frame in the upright position, it will be turned down to horizontal position and rest firmly upon the table-top O', and the cloth or paper will be laid upon its now upwardly-projecting cutting or marking edges.

For convenience of securing the material against accidental displacement and also to prevent it from being crowded out of position in the subsequent process of cutting or marking I provide the stools Q, which comprise a metal base Q', to which is secured a top Q², of cork or other suitable material easily perforated and not easily damaged by perforation, the metal base adapted in any convenient manner to be secured to the bars of the frame and the upper surface of the top Q² being at the level of the upper edges of the blades M when said stools are thus secured to the frame. A convenient form for adapting them for fastening to the frame is that indicated in the drawings, the base having a T-shaped stem provided with a cross q, which may be inserted through the slot in the bar and then turned across the bar, whereby it will be temporarily bound at any position at which it will thus be inserted and turned. As many of these stools may be employed as desired, and thumb tacks or pins being inserted through the paper or cloth into them will give the material sufficient fixedness on the machine to secure accuracy in marking or cutting. A thin fabric may be stretched on the frame or stools to give more complete support to the goods when the machine is used for marking or perforating.

For convenience and rapidity in cutting or marking I provide the frame P, onto which is stretched a sheet P' of leather, rubber, or similar flexible substance sufficiently tough or elastic not to be too easily cut by contact with the blades. This frame P is also hinged to the table O at the bearings $p$ and normally hangs down at the rear side of the table, but will now be swung over to horizontal position, so that the leather or rubber or other fabric P' will rest upon the frame A. A roller S, journaled in a suitable yoke or forked handle S', being rolled back and forth above the fabric P' will cause the latter to press the cloth or paper down onto the upstanding edges of the blades M and cause said edges to mark, perforate, or cut the material and complete the pattern or cutting of the garment. For heavy work requiring more pressure than can be conveniently put upon the roller by the hand of the operator such roller may be provided with guides in the side of the frame P. The best construction for this purpose I consider to be that shown in the drawings, particularly in Fig. 20, wherein are shown at the lateral edges of the frame P, on the back or upper side, overhanging flanges P² P², provided with racks $p^2$, facing toward the plane of the fabric P', and on the ends of the roller-shaft pinions S² S², adapted to mesh with the racks $p^2$, respectively, said pinions being rigid with the roller-shaft, but the roller being loose on its shaft. When the frame P has been turned down upon the cloth, as above described, the pinions S² S² will be introduced under the overhanging flanges at their ends, care being taken that the roller-shaft is at right angles to the racks at starting, and if this is done the shaft will remain at right angles to the racks while the roller is pushed across the frame. Hooks R R will be provided by which the frame P will be locked down to the table, and the proportion of the parts—to wit, the roller and pinions—with respect to the distance of the racks from the plane of the cutting-edges of the blades M when the frame is thus locked down to the table is such that the roller in traversing the frame above the fabric P' will force the under surface of the latter fully down to the plane of the cutting-edges, and thereby perfectly cut the paper or cloth intervening. If the material P' is suitably tough, the adjustment of the frames when thus locked together may be such that the cutting or perforating edges may penetrate slightly above the under surface of said sheet P', so that the latter may be slightly indented in the process for the purpose of more perfectly insuring the complete cutting or perforating of the fabric being operated upon.

I have heretofore used this machine in the form in which it is shown in a certain British patent granted to me November 4, 1887, No. 15,021, in which the clamping-nuts for the blade-supports are at the forward side instead of at the rear side of the frame. In that case the structure which is illustrated in Fig. 7 may be employed for the blade-support, the seat for the blade being swiveled to a clamp which consists of a tubular stem N⁷, protruding out through the slot in the bar from a clamp-disk or flange N⁷⁰, which binds against the inner surface of the slotted side of the bar, such stem being threaded and the nut N⁵ being screwed onto its protruding end back of the blade-seat.

I claim—

1. In a cutting and marking machine, in combination with the outline-frame and the flexible blades projecting edgewise from the plane of said frame, bars extending transversely across the outline-frame, shafts extending longitudinally through said bars and journaled therein, and pinions fixed on the opposite ends of said shafts, the side bars of the outline-frame having racks in which said pinions engage and travel, and the blade-supports adjustable longitudinally with respect to said bars, substantially as set forth.

2. In a cutting and marking machine, in combination with a base-frame comprising a plurality of bars, the flexible blades and supports for such blades, mounted and adjustable longitudinally and adapted to be secured in adjusted position on such bars, said blade-supports having the immediate seat for the blades adapted to permit the blade to slide longitudinally therethrough and swiveled to the secured portion of the support, whereby the blades are permitted to assume flowing outlines controlled by the position of the support on the frame, substantially as set forth.

3. In a cutting and marking machine, a slotted bar, in combination with a blade-support, which consists of the yoke $N^4$ within the bar, having a stem projecting through the slot at one side of the bar and a clamp-nut on said stem outside the bar, and the immediate seat for the blade, located at the opposite side of the bar and provided with a stem projecting through the slot at that side and swiveled to the yoke, said yoke having an aperture $n^4$, substantially as set forth.

4. In a cutting and marking machine, in combination with a bar slotted longitudinally through from side to side, the blade-support adapted to slide longitudially in such slot, consisting of the yoke $N^4$ within the bar and having a stem projecting out through the slot at one side, and the immediate seat for the blade, having a stem projecting in through the slot from the opposite side and swiveled to the yoke, the clasp $N^6$ on the protruding stem of the yoke and having flanges which embrace the bar, and the clamp-nut on the stem outside the clasp, substantially as set forth.

5. In combination with the frame comprising a longitudinally-slotted bar, the blade-support adapted to be adjusted and secured in said bar, having an arm adjustably secured to it provided with a swiveled seat for the blade at one end, substantially as set forth.

6. In combination with the frame comprising a longitudinally-slotted bar, and the blade-support adapted to be adjusted and secured in such bar and having an arm swiveled to it, said arm being provided at the free end with a swiveled seat for the blade, substantially as set forth.

7. In combination with the base-frame and the blades secured thereto, the stools Q, removably secured to the frame and having their upper surfaces at the plane of the operating edges of the blades, substantially as set forth.

8. In a cutting and marking machine, in combination with the outline-frame comprising side bars having longitudinal racks $a'$, the bar D, extending transversely between said side bars and having telescoping end pieces, and the pinions having ball-and-socket joint bearing on said end pieces, said pinions being adapted to engage the racks, the side bar having a guard-lip behind which the pinions are retained, substantially as set forth.

9. In a cutting and marking machine, a base-frame and the flexible blades and their supports adjustable with respect to said frame, combined with a stand, to one edge of which such base-frame is hinged, such hinge being adapted to permit the frame to swing from a horizontal position on the table to an upstanding position above the hinge, such stand being recessed at the side opposite the hinge, whereby the operator may approach the upstanding frame to operate it from the side which is downward when the frame is horizontal on the stand, substantially as set forth.

10. In combination with the stand, a frame having the cutting-blades secured to it, hinged to the stand, and adapted to be set upright or laid horizontal at will, and a frame having the flexible fabric P' also hinged to the stand and adapted to fold down over the blade-carrying frame, substantially as and for the purpose set forth.

11. In combination with the stand, the blade-carrying frame hinged thereto and adapted to be folded down thereupon, the frame P, having the flexible fabric P', also hinged to the stand and adapted to be folded down upon the blade-carrying frame, said frame P having rigid with its side bars racks overhanging the plane of the fabric P', and the roller S, having equal pinions $S^2$, rigid with its shaft, at its opposite ends and adapted to engage the racks, respectively, and the forked handle having bearings for the roller-shaft between the roller and the pinions, substantially as set forth.

In testimony whereof I have hereunto set my hand, in the presence of two witnesses, at Chicago, Illinois, this 19th day of October, 1891.

SARAH ANNE COOKE.

Witnesses:
CHAS. S. BURTON,
JEAN ELLIOTT.